United States Patent Office 3,117,975
Patented Jan. 14, 1964

3,117,975
SUBSTITUTED PYRROLIDINONES AND
PIPERIDINONES
Newman M. Bortnick, Oreland, and Marian F. Fegley,
Mont Clare, Pa., assignors to Rohm & Haas Company,
Philadelphia, Pa., a corporation of Delaware
No Drawing. Filed Apr. 22, 1960, Ser. No. 23,894
12 Claims. (Cl. 260—325)

This invention deals with specific substituted pyrrolidinones and piperidinones as new compositions of matter. It further deals with a method for the preparation of these specific substituted pyrrolidinones and piperidinones.

The compounds of this invention are prepared by reacting a compound having the formula

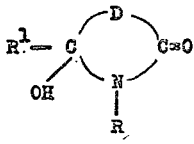

with a mercaptan having the formula $R^2SH$. In the above formula, the symbol R represents a hydrogen atom, an alkyl group of one to eighteen carbon atoms, an aryl group of up to ten carbon atoms, an aralkyl group of up to twelve carbon atoms, an alkarylalkyl group of up to twenty carbon atoms, an alkoxyalkyl group of three to ten carbon atoms, and an alkylaminoalkyl group of three to eighteen carbon atoms provided that the amino group is a secondary or tertiary structure, that is non-primary. Alkyl, in the above definition, is to be construed to include cycloalkyl and alkyl-cycloalkyl within the range of carbon atoms previously set forth.

Typical R representations are hydrogen, methyl, ethyl, butyl, octyl, decyl, dodecyl, octadecyl, cyclopentyl, cyclohexyl, phenyl, naphthyl, benzyl, phenylethyl, phenylbutyl, phenyldodecyl, methylphenyl, ethylphenyl, methoxyethyl, methoxypropyl, ethoxyethyl, propoxyethyl, butoxyethyl, pentoxyethyl, octoxydodecyl, nonoxypropyl, nonoxyheptyl, nonoxytridecyl, decoxyethyl, hydroxyethyl, hydroxypropyl, hydroxybutyl, hydroxypentyl, hydroxyoctyl, N,N-dimethylaminoethyl, N,N-dipropylaminopropyl, morpholinopropyl and pyrrolidinoethyl.

The symbol $R^1$ represents hydrocarbon groups of one to ten carbon atoms, preferably alkyl, arylalkyl, cycloalkyl, aryl, and alkaryl. $R^1$ may typically represent methyl, butyl, octyl, benzyl, phenylbutyl, cyclopentyl, cyclohexyl, phenyl, naphthyl, butylphenyl groups, and the like.

D is a divalent chain containing two to three carbon atoms. The carbon atoms in the D chain may have their remaining valences satisfied by hydrogen atoms, by alkyl groups whose total carbon atom content is no greater than 18, or by combinations of hydrogen atoms and alkyl groups. When D contains two carbon atoms, there are four valences to be satisfied by hydrogen atoms, alkyl groups, or combinations thereof. For instance, there may be four hydrogen atoms, four alkyl groups, three hydrogen atoms and one alkyl group, two hydrogen atoms and two alkyl groups, or one hydrogen atom and three alkyl groups. When D contains three carbon atoms, there are six valances to be satisfied by hydrogen atoms, alkyl groups, or combinations thereof and these valences may be satisfied in a way analogous to the manner described above when D contains two carbon atoms. It is also possible for the above-mentioned alkyl substituents to be joined together to form carbocyclic rings in conjunction with the D chain. When D represents a three carbon chain $R^1$ may represent a hydrogen atom in addition to the other embodiment, discussed previously.

The alkyl substituents on the carbon atoms of the D chain may have any possible spatial configurations, such as normal, iso, tertiary, and the like. These alkyl substituents may also be straight chained or cyclic. Typical of the alkyl substituents that may be used to satisfy the remaining valences of the carbon atoms in the D chain include methyl, ethyl, propyl, butyl, cyclopentyl, hexyl, cyclohexyl, octyl, decyl, dodecyl, tridecyl, tetradecyl, and octadecyl groups.

Typical of the specific substituted pyrrolidinones and piperidinones that may be employed as reactants in the present invention are 4,5-dimethyl-5-hydroxy-2-pyrrolidinone,
7a-hydroxy-3-3-pentamethylene-2,3,3a,4,5,6,7,7a-
 octahydroindol-2-one,
3-methyl-3,5-dipropyl-5-hydroxy-2-pyrrolidinone,
1-(2-phenylethyl)-3,3,5-trimethyl-5-hydroxy-2-
 pyrrolidinone,
3,3,5-trimethyl-5-hydroxy-2-pyrrolidinone,
3,5-dimethyl-3-neopentyl-5-hydroxy-2-pyrrolidinone,
1-(3-diethylaminopropyl)-3,3,5-trimethyl-5-hydroxy-2-
 pyrrolidinone,
1-(2-dimethylaminoethyl)-3,3,5-trimethyl-5-hydroxy-2-
 pyrrolidinone,
1-benzyl-3,3,5-trimethyl-5-hydroxy-2-pyrrolidinone,
1-p-tolyl-3,3,5-trimethyl-5-hydroxy-2-pyrrolidinone,
1-(3-dimethylaminopropyl)-3,5-dimethyl-3-neopentyl-5-
 hydroxy-2-pyrrolidinone,
1-(3-methoxypropyl)-3,3,5-trimethyl-5-hydroxy-2-
 pyrrolidinone,
3,5-dimethyl-3-hexyl-5-hydroxy-2-pyrrolidinone,
1-dodecy-3,3,5-trimethyl-5-hydroxy-2-pyrrolidinone,
3,6-dimethyl-3-(2,2-dimethylpropyl)-6-hydroxy-2-
 piperidinone,
1-methyl-3,6-dipropyl-6-hydroxy-2-piperidinone,
1,3,3,6-tetramethyl-6-hydroxy-2-piperidinone,
1-(2-dimethylaminoethyl)-3,3,6-trimethyl-6-hydroxy-2-
 piperidinone,
3,3,6-trimethyl-6-hydroxy-2-piperidinone,
3,6-dimethyl-3-neopentyl-6-hydroxy-2-piperidinone,
3,6-dihexyl-3-methyl-6-hydroxy-2-piperidinone,
1-p-tolyl-3,3,6-trimethyl-6-hydroxy-2-piperidinone,
1,5,5-trimethyl-6-hydroxy-2-piperidinone,
5,5-dimethyl-4-ethyl-6-hydroxy-2-piperidinone,
3,6-di-(2-methylpropyl)-3-methyl-6-hydroxy-2-
 piperidinone,
1-(2-diethylaminoethyl)-5,5-dimethyl-6-hydroxy-2-
 piperidinone,
3,4-dimethyl-3-hexyl-6-hydroxy-2-piperidinone,
5,5-dimethyl-6-hydroxy-2-piperidinone,
spiro{3,3-dimethylbicyclo(2.2.1)heptane-2,3'-[6'-methyl-
 6'-hydroxy-2'-piperidinone]},
3,4,4-trimethyl-6-hydroxy-2-piperidinone,
3,6-dibutyl-5-methyl-6-hydroxy-2-piperidinone.

The piperidinone and pyrrolidinone reactants employed in the present process may be obtained by cyclization of α- and δ-oxonitriles. It is possible to start with α- and δ-oxonitriles and, by cyclization and hydration, obtain the corresponding 5-hydroxy-2-pyrrolidinone and 6-hydroxy-2-piperidinone reactants. The products of this invention may then be derived by reaction with a compound having the formula $R^2SH$ in the presence of an alkali to be more fully described hereinafter. Thus, it is possible to go from the α-oxonitriles and δ-oxonitriles to the specific 2-pyrrolidinones and 2-piperidinones of this invention in a rather continuous way without the necessity of separating or purifying the 5-hydroxy-2-pyrrolidinones or 6-hydroxy-2-piperidinones. It is, of course, generally desirable, from the viewpoint of yields, to employ as reactants the specific pyrrolidinones and piperidinones discussed heretofore.

The other reactant employed in the present invention has the formula R²SH in which R² contains from one to eighteen carbon atoms. R² may be an alkyl group of one to eighteen carbon atoms, a cycloalkyl group of four to eight carbon atoms, alkoxyalkyl group of two to eighteen carbon atoms, a phenylalkyl group of seven to eighteen carbon atoms, an alkyl substituted phenylalkyl group of eight to eighteen carbon atoms, a phenoxyalkyl group of seven to eighteen carbon atoms, an alkyl substituted phenoxyalkyl group of eight to eighteen carbon atoms, a phenoxypolyalkoxyalkyl group of eight to eighteen carbon atoms, an alkyl substituted phenoxypolyethoxyalkyl group of nine to eighteen carbon atoms, a hydroxyalkyl group of two to eighteen carbon atoms, or a mercaptoalkyl group of two to eighteen carbon atoms.

When R² represents a mercaptoalkyl group, the product will have the formula

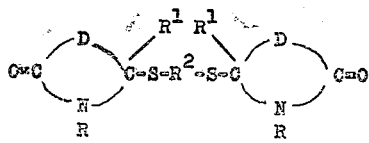

when R² represents a hydroxyalkyl group, the product will have the formula

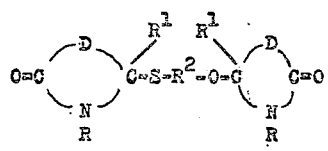

In all other instances, the product has the formula

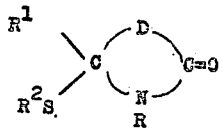

Typical of the R²SH reactants are methanethiol, ethanethiol, butanethiol, hexanethiol, decanethiol, dodecanethiol, hexadecanethiol, and octadecanethiol, methoxyethanethiol, methoxybutanethiol, methoxydecanethiol, methoxyhexadecanethiol, ethoxyethanethiol, ethoxyoctanethiol, ethoxydodecanethiol, propoxypropanethiol, propoxyheptanethiol, propoxyundecanethiol, butoxybutanethiol, butoxytetradecanethiol, hexoxyhexanethiol, hexoxydodecanethoil, octoxynonanethiol, octoxydecanethiol, nonoxynonanethiol, decoxybutanethiol, dodecoxyhexanethiol, phenylmethanethiol, phenylethanethiol, phenylbutanethiol, phenyldecanethiol, phenyldodecanethiol, methylphenylmethanethiol, butylphenyloctanethiol, dibutylphenylethanethiol, octylphenylethanethiol, nonylphenylpropanethiol, cyclohexanethiol, butylcyclohexanethiol, octylcyclohexanethiol, propropylcycloheptanethiol, phenoxytriethoxyethanethiol, phenoxytripropoxypropanethiol, butylphenoxyethoxyethanethiol, octylphenoxyethoxyethanethiol, ethanedithiol, hexanedithiol, decanedithiol, and octadecanedithiol glycol. The two thiol groups may be positioned on any two carbon atoms in the alkylene chain with the alpha and omega positions somewhat preferred.

The present reaction is conducted in the presence of a basic catalyst ranging in amounts from .005% by weight to stoichiometric amounts, preferably employing amounts of about 0.1 to 20% by weight of the total weight of the reactants. Suitable as a catalyst are alkali metals and their carbonates, alkali and alkaline earth metal lower alkoxides, oxides and hydroxides, secondary amines, tertiary amines, and quaternary ammonium bases. Actually there may be employed as a catalyst any base whose aqueous 0.1 molar solution has a pH of about at least 9. Typical examples of the catalyst that may be used are sodium, potassium, lithium, sodium methoxide, potassium butoxide, lithium ethoxide, magnesium ethoxide, sodium oxide, potassium hydroxide, calcium oxide, barium hydroxide, strontium hydroxide, sodium carbonate, potassium carbonate, dimethylamine, diethylamine, trimethylamine, triethylamine, triethanolamine, octyldimethylamine, N-methylmorpholine, benzyl-trimethylammonium hydroxide, dibenzyldimethylammonium hydroxide, dodecenyltriethylammonium hydroxide, and the like.

Temperatures in the range of 35° to 150° C., preferably 50° to 110° C. are employed. The reaction is conducted within the temperature ranges at a temperature where the compound R²SH is liquid or molten. The reaction may be conducted without the use of a solvent, but a solvent is frequently desirable if the compound R²SH is neither liquid nor molten within the stated temperature ranges. If the solvent is desired, there may be used water, hydrocarbons, secondary or tertiary alcohols, ethers, nitriles, secondary amides and the like and preferably one that forms an azeotrope with water. Typically these may be benzene, toluene, heptane, isooctane, isopropyl alcohol, secondary butanol, tertiary butanol, methyl isobutylcarbinol, diisopropyl ether, dibutyl ether, acetonitrile, isobutyronitrile, dimethylformamide, dimethylacetamide, and the like.

The products obtained are pasty or crystalline solids or viscous liquids which are isolated generally by simply stripping off the lighter components. This is particularly so when only small amounts of catalyst are used. Otherwise, the catalyst is neutralized with acids, such as hydrochloric and sulfuric, and the products are separated from the salts by extraction with suitable solvents which dissolve the product but not the salts, such as benzene, and the like.

The products of this invention are useful fungicides, particularly when applied against *Stemphylium sarcinaeforme* and evaluated according to standard methods. These compounds are especially effective in concentrations of one and a half to two pounds per one hundred pounds of spray mix and show no appreciable phytotoxicity. Particularly effective in this respect are 5-dodecylthio- and 5-butylthio-3,3,5-trimethyl-2-pyrrolidinone.

The present invention may be more fully understood from the following examples which are offered by way of illustration and not by way of limitation. Parts by weight are used throughout.

*Example 1*

A mixture of butyl mercaptan (30 parts) and 5-hydroxy-3,3,5-trimethyl-2-pyrrolidinone (30 parts) and sodium methoxide (0.3 part) is heated at 70° to 75° C. for 24 hours. The mixture is then stripped under reduced pressure at 80° C. The residue (48 parts) solidifies on cooling. The product is extremely soluble in organic solvents but is crystallized from heptane by cooling in a Dry Ice-acetone bath. The crude product has a melting point of 40° to 44° C. Recrystallization from heptane gives the analytical sample, melting point 51° to 52° C. The product contains 6.45% nitrogen (theoretical 6.50%). The product is identified as the desired material, 5-butylthio-3,3,5-trimethyl-2-pyrrolidinone.

In a similar fashion, n-hexylmercaptan and 4,5-dimethyl-2-pyrrolidinone give 5-hexylthio-4,5-dimethyl-2-pyrrolidinone, 6-hydroxy-5-ethyl-5-butyl-2-piperidinone and butyl mercaptan give 6-butylthio-5-ethyl-5-butyl-2-piperidinone, and 1-hydroxy-1-methyl-1,3,3a,4,5,6,7,7a-octahydroisoindol-3-one and octyl mercaptan give 1-octylthio-1-methyl-1,3,3a,4,5,6,7,7a-octahydroisoindol-3-one.

*Example 2*

3,3,5-trimethyl-5-hydroxy-2-pyrrolidinone (36 parts), dodecyl mercaptan (55 parts) and sodium hydroxide (0.3 part) are combined and heated at 95° C. for 24 hours. The mixture crystallizes on cooling and has a melting point of 43° to 46° C. after washing with acetone, cooling to −78° C., and drying. The product contains 4.1% nitrogen (theoretical 4.28%) and 9.5% sulfur (theoretical 9.79%). The product is identified as 5-dodecylthio-3,3,5-trimethyl-2-pyrrolidinone.

*Example 3*

The conditions of Example 2 are repeated except that benzene (100 parts by volume) is also added. The mixture is boiled under reflux until water (0.25 mole) (4.5 parts) has separated. Evaporation of the benzene under reduced pressure gives the same product in quantitative yield.

In a similar fashion are prepared the 5-phenylthio, the 5-benzylthio, the 5-octadecylthio, and the 5-butoxyethylthio-3,3,5-trimethyl-2-pyrrolidinones from 5-hydroxy-3,3,5-trimethyl-2-pyrrolidinone and the corresponding mercaptans, thiophenol, benzyl mercaptan, octadecyl mercaptan, and 2-butoxyethyl mercaptan, respectively.

In a similar fashion, dodecyl mercaptan and 3-methyl-5-hydroxy-3,5-bis-(2-methylpropyl)-2-pyrrolidinone give 5-dodecylthio-3-methyl-3,5 - bis - (2 - methylpropyl) - 2-pyrrolidinone, cyclohexyl mercaptan and 3,5-dihexyl-3-methyl-5-hydroxy-2-pyrrolidinone give 5-cyclohexylthio-3-methyl-3,5-dihexyl-2-pyrrolidinone, dodecenyl mercaptan (5,5,7,7-tetramethyloct-2-en-1-thiol) and 7a-hydroxy-3,3-pentamethylene-2,3,3a,4,5,6,7,7a-octahydroindol-2-one give 7a-dodecenylthio-3,3-pentamethylene - 2,3,3a,4,5,6,7-7a-hexahydroindol-2-one, and 2-mercaptoethanol and 5-hydroxy-3,3,5-trimethyl-2-pyrrolidinone give 5-(2-hydroxyethyl)-3,5,5-trimethyl-2-pyrrolidinone.

*Example 4*

1,2-ethanedithiol (29 parts), 3,3,5-trimethyl-5-hydroxy-2-pyrrolidinone (86 parts), potassium carbonate (0.5 part) and dimethyl formamide (30 parts by volume) are heated at 90° C. for 18 hours. The crystalline solid (83 parts) is separated by filtration and washed with acetone and dried in air. It has a melting point of 171°–175° C. The filtrate is stripped and the residue is allowed to stand at room temperature for an additional week. Additional crystalline solid separates. This is washed with acetone and again dried to give additional product (19 parts) which has the same melting point range. The product is identified as 1,2-bis-[(3,3,5-trimethylpyrrolidin-2-on-5-yl)thio]-ethane.

In a similar fashion there are formed 1,2-bis[(4,5-dimethylpyrrolidin-2-on-5-yl)thio]-ethane from ethanedithiol and 5-hydroxy-4,5-dimethyl-2-pyrrolidinone, 1,7-bis(3,3,5-trimethylpyrrolidin-2-on - 5 - yl) - 1,4,7 - trithiaheptane from 5-hydroxy-3,3,5-trimethyl-2-pyrrolidinone and 1,4,7-trithiaheptane, and 1,7-bis[3,5-dimethyl-3-(2-2-dimethylpropyl)pyrrolidin-2-on-5-yl]-4-oxa-1,7 - dithiaheptane from 5-hydroxy-3,5-dimethyl-3-(2,2-dimethylpropyl)-2-pyrrolidinone and 4-oxa-1,7-dithiaheptane.

We claim:

1. A composition of matter from the class consisting of

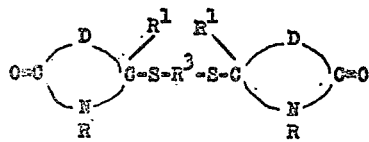

and

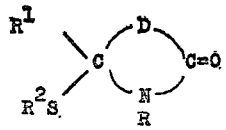

in which R is a member of the group consisting of hydrogen, alkyl of one to eighteen carbon atoms, phenyl, naphthyl, phenylalkyl of up to eighteen carbon atoms, alkylphenylalkyl of up to thirty carbon atoms, alkoxyalkyl of three to twenty-four carbon atoms, hydroxyalkyl of two to twelve carbon atoms, and alkylaminoalkyl of three to eighteen carbon atoms, $R^1$ is a hydrocarbon group of one to ten carbon atoms from the class consisting of alkyl, phenylalkyl, cycloalkyl, phenyl, naphthyl, and alkylphenyl, $R^2$ is a member from class consisting of alkyl of one to eighteen carbon atoms, cycloalkyl of four to eight carbon atoms, alkoxylalkyl of two to eighteen carbon atoms, phenylalkyl of seven to eighteen carbon atoms, alkyl substituted phenylalkyl of eight to eighteen carbon atoms, phenoxyalkyl of seven to eighteen carbon atoms, alkyl substituted phenoxyalkyl of eight to eighteen carbon atoms, phenoxypolyalkoxyalkyl of eight to eighteen carbon atoms, and alkyl substituted phenoxypolyethoxyalkyl of nine to eighteen carbon atoms, $R^3$ is alkylene of two to eighteen carbon atoms, and D is a divalent hydrocarbon chain containing two to three carbon atoms, the remaining valences of said two to three carbon atoms of said D are satisfied by members of the group consisting of hydrogen atoms, alkyl groups having a total carbon atom content of up to eighteen and combinations of said hydrogen atoms and said alkyl groups.

2. As a composition of matter, 5-dodecylthio-3,3,5-trimethyl-2-pyrrolidinone.

3. As a composition of matter, 5-butylthio-3,3,5-trimethyl-2-pyrrolidinone.

4. As a composition of matter, 5-benzylthio-3,3,5-trimethyl-2-pyrrolidinone.

5. As a composition of matter, 1,2-bis-[(3,3,5-trimethylpyrrolidin-2-on-5-yl)thio]-ethane.

6. As a composition of matter, 7a-dodecenylthio-3,3-pentamethylene-2,3,3a,4,5,6,7,7a-hexahydroindol-2-one.

7. A method for the preparation of a compound having the formula

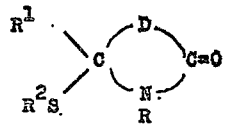

in which R is a member of the group consisting of hydrogen, alkyl of one to eighteen carbon atoms, phenyl, naphthyl, phenylalkyl of up to eighteen carbon atoms, alkylphenylalkyl of up to thirty carbon atoms, alkoxaykyl of three to tweny-four carbon atoms, hydroxyalkyl of two to twelve carbon atoms, and alkylaminoalkyl of three to eighteen carbon atoms, $R^1$ is a hydrocarbon group of one to ten carbon atoms from the class consisting of alkyl, phenylalkyl, cycloalkyl, phenyl, naphthyl, and alkylphenyl, $R^2$ is a member from the class consisting of alkyl of one to eighteen carbon atoms, cycloalkyl of four to eight carbon atoms, alkoxylalkyl of two to eighteen carbon atoms, phenylalkyl of seven to eighteen carbon atoms, alkyl substituted phenylalkyl of eight to eighteen carbon atoms, phenoxyalkyl of seven to eighteen carbon atoms, alkyl substituted phenoxyalkyl of eight to eighteen carbon atoms, phenoxypolyalkoxyalkyl of eight to eighteen carbon atoms, and alkyl substituted phenoxypolyethoxyalkyl of nine to eighteen carbon atoms, and D is a divalent hydrocarbon chain containing two to three carbon atoms, the remaining valences of said two to three carbon atoms of said D are satisfied by members of the group consisting of hydrogen atoms, alkyl groups having a total carbon atom content of up to eighteen and combinations of said hydrogen atoms and said alkyl groups, which comprises bringing together and thereby reacting at a temperature of about 35° to 150° C. in the presence of a basic catalyst whose aqueous 0.1 molar solution has a pH of about at least 9, the compound having the formula

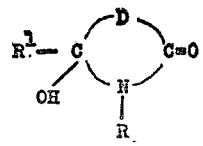

with one having the formula $R^2SH$ where R, $R^1$, $R^2$ and D are as defined above.

8. A method according to claim 7 in which the reaction temperature is in the range of about 50° to 110° C.

9. A method for the preparation of a compound having the formula

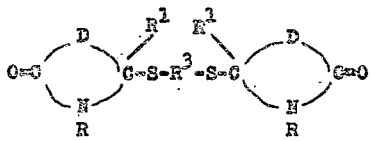

in which R is a member of the group consisting of hydrogen, alkyl of one to eighteen carbon atoms, phenyl, naphthyl, phenylalkyl of up to eighteen carbon atoms, alkylphenylalkyl of up to thirty carbon atoms, alkoxyalkyl of three to twenty-four carbon atoms, hydroxyalkyl of two to twelve carbon atoms, and alkylaminoalkyl of three to eighteen carbon atoms, $R^1$ is a hydrocarbon group of one ten carbon atoms from the class consisting of alkyl, phenylalkyl, cycloalkyl, phenyl, naphthyl, and alkylphenyl, $R^3$ is alkylene of two to eighteen carbon atoms, and D is a divalent hydrocarbon chain containing two to three carbon atoms, the remaining valences of said two to three carbon atoms of said D are satisfied by members of the group consisting of hydrogen atoms, alkyl groups having a total carbon atom content of up to eighteen and combinations of said hydrogen atoms and said alkyl groups, which comprises bringing together and thereby reacting at a temperature of about 35° to 150° C. in the presence of a basic catalyst whose aqueous 0.1 molar solution has a pH of about at least 9, with a compound having the formula

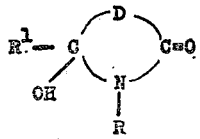

with one having the formula $SHR^3SH$ where R, $R^1$, $R^3$ and D are as defined above.

10. A method according to claim 9 in which the reaction temperature is in the range of about 50° to 110° C.

11. A method for the preparation of a compound having the formula

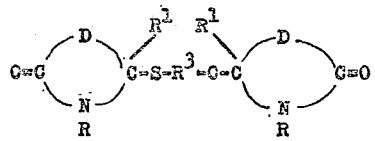

in which R is a member of the group consisting of hydrogen, alkyl of one to eighteen carbon atoms, phenyl, naphthyl, phenylalkyl of up to eighteen carbon atoms, alkylphenylalkyl of up to thirty carbon atoms, alkoxyalkyl of three to twenty-four carbon atoms, hydroxyalkyl of two to twelve carbon atoms, and alkylaminoalkyl of three to eighteen carbon atoms, $R^1$ is a hydrocarbon group of one to ten carbon atoms from the class consisting of alkyl, phenylalkyl, cycloalkyl, phenyl, naphthyl, and alkylphenyl, $R^3$ is alkylene of two to eighteen carbon atoms, and D is a divalent hydrocarbon chain containing two to three carbon atoms, the remaining valences of said two to three carbon atoms of said D are satisfied by members of the group consisting of hydrogen atoms, alkyl groups having a total carbon atom content of up to eighteen and combinations of said hydrogen atoms and said alkyl groups, which comprises bringing together and thereby reacting at a temperature of about 35° to 150° C. in the presence of a basic catalyst, the compound having the formula

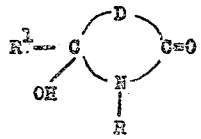

with one having the formula $SHR^3OH$ where R, $R^1$, $R^3$, and D are as defined above.

12. A method according to claim 11 in which the reaction temperature is in the range of about 50° to 110° C.

No references cited.